(12) United States Patent
Armour et al.

(10) Patent No.: US 9,229,771 B2
(45) Date of Patent: Jan. 5, 2016

(54) CLOUD BURSTING AND MANAGEMENT OF CLOUD-BURSTED APPLICATIONS

(75) Inventors: David J. Armour, Bellevue, WA (US); Richard O. Rundle, Kirkland, WA (US); John David Welch, Bellevue, WA (US); Yuan Zheng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 13/415,686

(22) Filed: Mar. 8, 2012

(65) Prior Publication Data

US 2013/0238772 A1     Sep. 12, 2013

(51) Int. Cl.
| | | |
|---|---|---|
| *G06F 15/173* | (2006.01) | |
| *G06F 15/16* | (2006.01) | |
| *G06F 9/48* | (2006.01) | |
| *H04L 29/08* | (2006.01) | |
| *G06F 9/50* | (2006.01) | |

(52) U.S. Cl.
CPC ............ *G06F 9/4843* (2013.01); *G06F 9/4856* (2013.01); *G06F 9/5072* (2013.01); *H04L 67/1002* (2013.01)

(58) Field of Classification Search
CPC ..................... H04L 41/0213; H04L 29/08144; G06F 17/30286
See application file for complete search history.

(56) References Cited

U.S. PATENT DOCUMENTS

| | | | |
|---|---|---|---|
| 5,881,268 A | 3/1999 | McDonald et al. | |
| 6,029,258 A | 2/2000 | Ahmad | |
| 6,282,535 B1 | 8/2001 | Pham et al. | |
| 6,493,323 B1 | 12/2002 | Dobrowolski et al. | |
| 6,907,395 B1 | 6/2005 | Hunt et al. | |
| 7,035,930 B2 | 4/2006 | Graupner et al. | |
| 7,231,436 B1 | 6/2007 | Dalfo et al. | |
| 7,441,021 B1 | 10/2008 | Perry | |
| 7,774,446 B2 | 8/2010 | Nedelcu et al. | |

(Continued)

FOREIGN PATENT DOCUMENTS

WO            2012000850            1/2012

OTHER PUBLICATIONS

"Cloud Computing—A Strategy Guide for Board Level Executives", Retrieved on: Dec. 23, 2011, Available at: http://download.microsoft.com/download/1/5/D/15DA1ED7-6005-4D18-A592-12EA315A3F4A/KynetixCloudComputingStrategyGuide.pdf.

(Continued)

*Primary Examiner* — Ario Etienne
*Assistant Examiner* — Ho Shiu
(74) *Attorney, Agent, or Firm* — Henry Gabryjelski; Stein Dolan; Micky Minhas

(57) ABSTRACT

Embodiments are directed to bursting application portions to different types of cloud computing systems, managing distributed applications distributed over a plurality of different cloud types and to creating a cloud bursting target in a specified cloud. In one scenario, a computer system provides an indication of available cloud computing systems including at least a first and a second cloud computing system of different types. The computer system receives a selection indicating that a portion of a software application currently hosted on the first cloud computing system of the first type is to be bursted onto the second cloud computing system. The computer system then, in response to the selection, bursts the software application portion from the first cloud computing system of the first type to the second cloud computing system of the second, different type.

20 Claims, 7 Drawing Sheets

(56) References Cited

U.S. PATENT DOCUMENTS

| | | | |
|---|---|---|---|
| 7,844,908 B2 | 11/2010 | Kodosky et al. | |
| 8,055,738 B2 | 11/2011 | Shah et al. | |
| 8,612,577 B2* | 12/2013 | Ferris et al. | 709/224 |
| 8,649,762 B1* | 2/2014 | Miller et al. | 455/407 |
| 8,875,041 B1* | 10/2014 | Desai et al. | 715/771 |
| 2002/0124245 A1 | 9/2002 | Maddux et al. | |
| 2003/0055919 A1 | 3/2003 | Fong et al. | |
| 2004/0078373 A1 | 4/2004 | Ghoneimy et al. | |
| 2004/0153869 A1 | 8/2004 | Marinelli et al. | |
| 2004/0225952 A1 | 11/2004 | Brown et al. | |
| 2005/0027846 A1 | 2/2005 | Wolfe et al. | |
| 2005/0049906 A1 | 3/2005 | Leymann et al. | |
| 2005/0096959 A1 | 5/2005 | Kumar et al. | |
| 2005/0149908 A1 | 7/2005 | Klianev | |
| 2006/0248522 A1 | 11/2006 | Lakshminarayanan | |
| 2006/0250578 A1 | 11/2006 | Pohl et al. | |
| 2008/0040455 A1 | 2/2008 | MacLeod et al. | |
| 2008/0120121 A1 | 5/2008 | Gilbert et al. | |
| 2008/0201454 A1 | 8/2008 | Soffer | |
| 2009/0217248 A1* | 8/2009 | Bently et al. | 717/132 |
| 2010/0094652 A1* | 4/2010 | Dorsett | 705/3 |
| 2010/0138822 A1* | 6/2010 | Miyazaki | 717/168 |
| 2010/0287280 A1 | 11/2010 | Sivan | |
| 2011/0131329 A1* | 6/2011 | Kaplinger et al. | 709/226 |
| 2011/0137805 A1* | 6/2011 | Brookbanks et al. | 705/80 |
| 2011/0138048 A1 | 6/2011 | Dawson et al. | |
| 2011/0145392 A1 | 6/2011 | Dawson et al. | |
| 2011/0145413 A1* | 6/2011 | Dawson et al. | 709/226 |
| 2011/0145439 A1 | 6/2011 | Chaturvedi et al. | |
| 2011/0270968 A1 | 11/2011 | Salsburg et al. | |
| 2011/0276951 A1 | 11/2011 | Jain | |
| 2011/0289493 A1* | 11/2011 | Keefe et al. | 717/168 |
| 2011/0307486 A1* | 12/2011 | Breslau et al. | 707/737 |
| 2011/0307780 A1* | 12/2011 | Harris et al. | 715/708 |
| 2011/0314082 A1* | 12/2011 | Koneti et al. | 709/203 |
| 2011/0320606 A1 | 12/2011 | Madduri et al. | |
| 2012/0030318 A1* | 2/2012 | Ryder | 709/220 |
| 2012/0030343 A1* | 2/2012 | Ryder | 709/224 |
| 2012/0042162 A1* | 2/2012 | Anglin et al. | 713/165 |
| 2012/0054551 A1* | 3/2012 | Gao et al. | 714/38.1 |
| 2012/0066667 A1* | 3/2012 | Mascaro et al. | 717/127 |
| 2012/0066769 A1* | 3/2012 | Latchem et al. | 726/26 |
| 2012/0072555 A1* | 3/2012 | DeLuca et al. | 709/220 |
| 2012/0072709 A1* | 3/2012 | Joukov et al. | 713/1 |
| 2012/0072914 A1* | 3/2012 | Ota | 718/100 |
| 2012/0079470 A1* | 3/2012 | Fukatsu | 717/168 |
| 2012/0096149 A1* | 4/2012 | Sunkara et al. | 709/224 |
| 2012/0102103 A1 | 4/2012 | Jacobson et al. | |
| 2012/0110044 A1* | 5/2012 | Nagpal et al. | 707/827 |
| 2012/0130778 A1* | 5/2012 | Cotton et al. | 705/14.1 |
| 2012/0137002 A1 | 5/2012 | Ferris et al. | |
| 2012/0137003 A1 | 5/2012 | Ferris et al. | |
| 2012/0189004 A1* | 7/2012 | Hendel | 370/360 |
| 2012/0203823 A1 | 8/2012 | Manglik et al. | |
| 2012/0204187 A1* | 8/2012 | Breiter et al. | 718/105 |
| 2012/0221535 A1* | 8/2012 | Dubbels et al. | 707/694 |
| 2012/0221690 A1* | 8/2012 | Beaty et al. | 709/221 |
| 2012/0222041 A1* | 8/2012 | Sabin et al. | 718/105 |
| 2012/0233625 A1* | 9/2012 | Sabin et al. | 718/105 |
| 2012/0239792 A1* | 9/2012 | Banerjee et al. | 709/223 |
| 2012/0254433 A1* | 10/2012 | Gujral et al. | 709/226 |
| 2012/0291011 A1* | 11/2012 | Quine | 717/115 |
| 2012/0324070 A1* | 12/2012 | Campion et al. | 709/223 |
| 2012/0331532 A1* | 12/2012 | Walters et al. | 726/5 |
| 2013/0031136 A1* | 1/2013 | Shah | 707/783 |
| 2013/0036100 A1* | 2/2013 | Nagpal et al. | 707/692 |
| 2013/0042004 A1* | 2/2013 | Boss et al. | 709/226 |
| 2013/0060838 A1* | 3/2013 | Yaffe | 709/203 |
| 2013/0061220 A1* | 3/2013 | Gnanasambandam et al. | 718/1 |
| 2013/0085989 A1 | 4/2013 | Nayyar et al. | |
| 2013/0151657 A1* | 6/2013 | Lehman et al. | 709/217 |
| 2013/0185413 A1* | 7/2013 | Beaty et al. | 709/224 |
| 2013/0232185 A1 | 9/2013 | Armour et al. | |
| 2013/0268643 A1 | 10/2013 | Chang et al. | |
| 2013/0339419 A1 | 12/2013 | Emaru | |
| 2013/0346572 A1 | 12/2013 | Jain et al. | |
| 2014/0040884 A1* | 2/2014 | Donahue | 718/1 |
| 2014/0115161 A1 | 4/2014 | Agarwal et al. | |
| 2014/0149591 A1 | 5/2014 | Bhattacharya et al. | |
| 2014/0156813 A1 | 6/2014 | Zheng et al. | |

OTHER PUBLICATIONS

"Cloudsoft's Monterey Middleware—An Implementation of Intelligent Application Mobility", Retrieved on: Dec. 23, 2011, Available at http://www.cloudsoftcorp.com/wp-content/uploads/White-Paper-Monterey-Technical-Overview.pdf.

Crump, George, "Cloud Bursting with Distance VMotion", Published on: Jul. 12, 2010, Available at: http://www.storage-switzerland.com/articles/entries/2010/7/12_Cloud_Bursting_with_Distance_VMotion.html.

"Intel Cloud Builders Guide to Cloud Design and Deployment on Intel Platforms", Published on: Sep. 2011, Available at: http://www.intelcloudbuilders.com/docs/Intel_Cloud_Builders_EMC_Secure_Onboarding2.pdf.

"Oracle Cloud Computing", In Oracle White Paper, May 2010, 22 pages.

"Cloud Balancing, Cloud Bursting, and Intercloud", Published on: Jul. 9, 2009, Available at: http://devcentral.f5.com/weblogs/macvittie/archive/2009/07/09/cloud-balancing-cloud-bursting-and-intercloud.aspx.

"Bursting the Cloud", Published on: Sep. 3, 2008, Available at: http://devcentral.f5.com/weblogs/macvittie/archive/2008/09/03/3584.aspx.

Hnetynka et al. "Component Model for Unified Deployment of Distributed Component-based Software" 2004, Charles University, 13 pages. (The month of Publication is irrelevant because the year of application is clearly prior to the filing of the Application).

Lestideau "Towards Automated Software Component Configuration and Deployment" 2002, Domaine University, 2 pages. (The month of Publication is irrelevant because the year of Publication is clearly prior to the filing of the Application).

Perez, et al. "A Component-Based Software Infrastructure for Grid Computing"; html://www.ercim.org/publication/Ercim_News/enw59/Perez.html, Available at least as early as May 2006, 6 pages.

McCartney et al. "Application Development and Management in the Programmers' Playground", Published on Jun. 1998, Available at: http://citeseerx.ist.psu.edu/viewdoc/download?doi=10.1.1.29.5058&rep=rep1&type=pdf.

"Configuring Workflow", Retrieved on: Dec. 27, 2011, Available at: http://confluenceatlassian.com/display/JIRA/Configuring+Workflow.

Mitchell, Scott, "Creating Dynamic Data Entry User Interfaces", Published on: Dec. 2004, Available at: http://msdn.microsoft.com/en-us/library/aa479330.aspx.

Albrecht et al., "Remote Control: Distributed Application Configuration, Management, and Visualization with Plush." In USENIX Large Installation System Administration Conference (LISA), Nov. 2007.

"Appzero Cloud", Available at least as early as Sep. 2012, Available at <<http://www.appzero.com/content/appzero-cloud-0>>.

"HP Cloud Maps Deliver Optimized Performance and Service Levels for Cloud Environments", Available at least as early as Sep. 2012, Available at <<http://www8.hp.com/us/en/business-solutions/solution.html?compURI=1216661#.UE2maLJITD8>>.

"A New Approach to Deploying and Managing JavaEE Applications", Available at least as early as May 2010, Available at <<http://documents.bmc.com/products/documents/39/47/123947/123947.pdf>>.

Varia, Jinesh, "Amazon Web Services—Migrating Your Existing Applications to the AWS Cloud", Published Oct. 2010, Available at <<http://media.amazonwebservices.com/CloudMigration-main.pdf>>.

Binz, et al., "CMotion: A Framework for Migration of Applications into and between Clouds", In Proceedings of IEEE International Conference on Service-Oriented Computing and Applications, Dec. 2011, 4 pages.

U.S. Appl. No. 11/463,217, Jul. 1, 2009, Office Action.

(56) References Cited

OTHER PUBLICATIONS

U.S. Appl. No. 11/463,217, Jan. 11, 2010, Office Action.
U.S. Appl. No. 11/463,217, Mar. 30, 2010, Office Action.
U.S. Appl. No. 11/463,217, Aug. 16, 2010, Office Action.
U.S. Appl. No. 11/463,217, Dec. 6, 2011, Office Action.
U.S. Appl. No. 11/463,217, May 10, 2012, Office Action.
U.S. Appl. No. 13/410,496, Jun. 25, 2013, Office Action.
U.S. Appl. No. 13/410,496, Dec. 10, 2013, Notice of Allowance.
U.S. Appl. No. 13/706,231, Dec. 18, 2014, Office Action.
Office Action dated Jul. 29, 2015 cited in U.S. Appl. No. 13/706,231 (Copy Attached).

* cited by examiner

CLOUD BURSTING AND MANAGEMENT OF CLOUD-BURSTED APPLICATIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed for distribution and implementation on multiple different computer systems. Such software applications are referred to as distributed applications. These applications may be configured such that different portions or tiers of the application are capable of being run on different computer systems. As such, these application portions may be assigned for execution on different computer systems. In some cases, the computer systems may be the same type of computer system, while in other cases, the computer systems are different types of computer systems that may include different hardware, software and/or operating systems.

These computer systems may be provided and managed by a cloud hoster or cloud provider in the same or in another geographic region. As used herein, a "cloud provider" refers to an entity that provides cloud computing resources. The physical computer systems that actually run the cloud are opaque to the workload that uses the computer systems. As such, when a software application or service is running on the cloud, the application or service owner does not know on which computer system the service/application is actually running

BRIEF SUMMARY

Embodiments described herein are directed to bursting application portions to different types of cloud computing systems, managing distributed applications distributed over a plurality of different cloud types and to creating a cloud bursting target in a specified cloud. In one embodiment, a computer system provides an indication of available cloud computing systems including at least a first cloud computing system of a first type and a second cloud computing system of a second, different type. The computer system receives a selection indicating that a portion of a software application currently hosted on the first cloud computing system of the first type is to be bursted onto the second cloud computing system. Then, in response to the selection, the computer system bursts the software application portion from the first cloud computing system of the first type to the second cloud computing system of the second, different type.

In another embodiment, a computer system manages distributed applications distributed over multiple different cloud types. The computer system presents a view that shows software application portions running on various cloud computing systems. The computer system receives a user input indicating tasks that are to be performed on at least one software application portion running on a user-selected cloud computing system. The computer system then accesses the received user input to determine which task is to be performed using commands that are native to the user-selected cloud computing system. After making this determination, the computer system performs the determined task using native commands on the software application portion on the user-selected cloud computing system.

In yet another embodiment, a computer system creates a cloud bursting target in a specified cloud. The computer system provides an indication of available cloud computing systems including at least a first cloud computing system of a first type and a second cloud computing system of a second, different type. The computer system receives a first indication indicating that a first cloud computing system of a first type is to be used as a cloud bursting target. The cloud bursting target is a cloud computing system that is configured to host various portions of a software application according to predefined settings. The computer system then receives a second indication specifying data files and settings that are to be staged on the cloud bursting target and, in response to the received indications, creates the cloud bursting target according to the predefined settings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
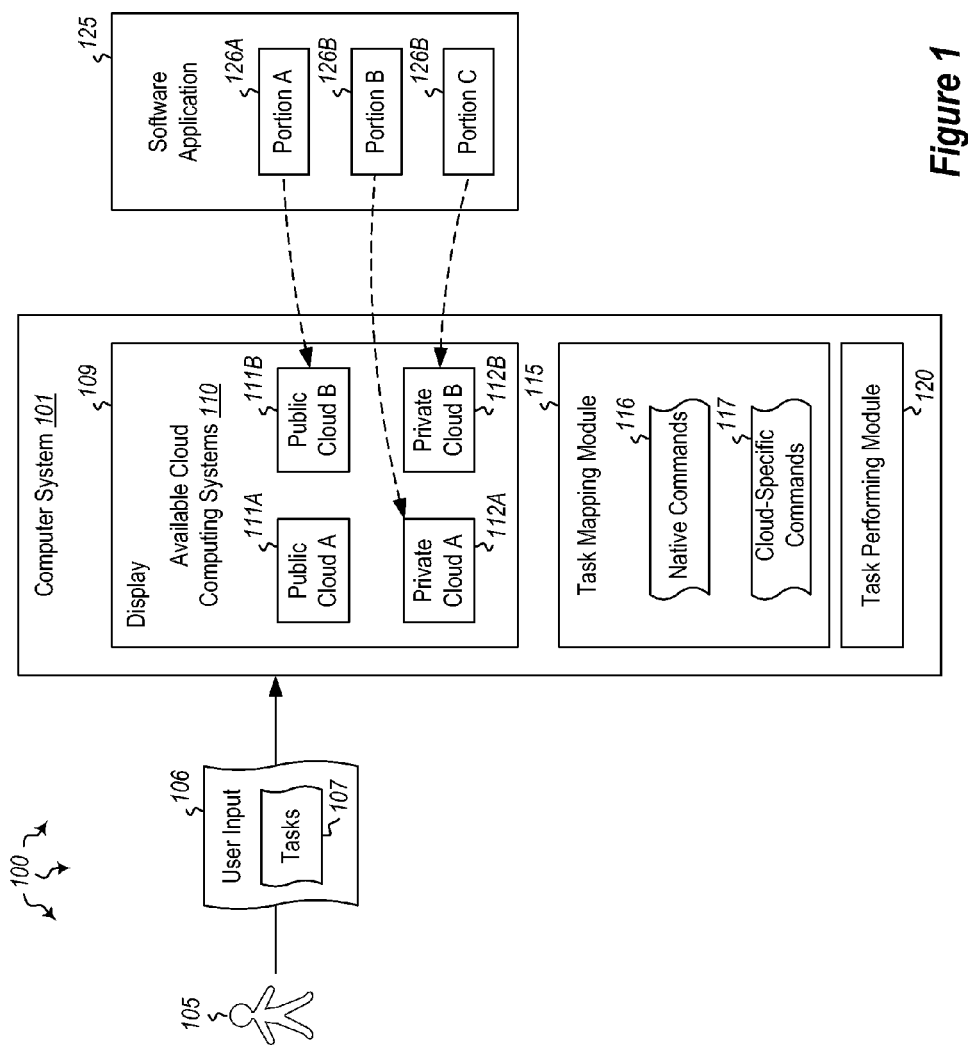
FIG. 1 illustrates a computer architecture in which embodiments of the present invention may operate including bursting application portions to different types of cloud computing systems.

Embodiments described herein are directed to bursting application portions to different types of cloud computing systems, managing distributed applications distributed over a plurality of different cloud types and to creating a cloud bursting target in a specified cloud. In one embodiment, a computer system provides an indication of available cloud computing systems including at least a first cloud computing system of a first type and a second cloud computing system of a second, different type. The computer system receives a selection indicating that a portion of a software application currently hosted on the first cloud computing system of the first type is to be bursted onto the second cloud computing system. Then, in response to the selection, the computer system bursts the software application portion from the first cloud computing system of the first type to the second cloud computing system of the second, different type.

In another embodiment, a computer system manages distributed applications distributed over multiple different cloud types. The computer system presents a view that shows software application portions running on various cloud computing systems. The computer system receives a user input indicating tasks that are to be performed on at least one software application portion running on a user-selected cloud computing system. The computer system then accesses the received user input to determine which task is to be performed using commands that are native to the user-selected cloud computing system. After making this determination, the computer system performs the determined task using native commands on the software application portion on the user-selected cloud computing system.

In yet another embodiment, a computer system creates a cloud bursting target in a specified cloud. The computer system provides an indication of available cloud computing systems including at least a first cloud computing system of a first type and a second cloud computing system of a second, different type. The computer system receives a first indication indicating that a first cloud computing system of a first type is to be used as a cloud bursting target. The cloud bursting target is a cloud computing system that is configured to host various portions of a software application according to predefined settings. The computer system then receives a second indication specifying data files and settings that are to be staged on the cloud bursting target and, in response to the received indications, creates the cloud bursting target according to the predefined settings.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

As used herein, the terms "cloud" or "cloud computing" refer to a model for enabling ubiquitous, convenient, on-demand network access to a shared pool of configurable computing resources (e.g., networks, servers, storage, applications, and/or services) that can be rapidly provisioned and released with minimal management effort or service provider interaction, as defined by the National Institute of Standards and Technology (NIST). The cloud computing model includes characteristics such as on-demand self-service, broad network access, resource pooling, rapid elasticity and measured service. The cloud computing model may be implemented in various service models including Software as a Service (SaaS), Platform as a Service (PaaS), or Infrastructure as a Service (IaaS), and may incorporate one or more deployment models including private clouds, community clouds, public clouds and hybrid clouds.

FIG. 1 illustrates a computer architecture 100 in which the principles of the present invention may be employed. Computer architecture 100 includes computer system 101. Computer system 101 may be any type of local or distributed computer system, including a cloud computing system. The computer system may also be any type of physical or virtual computer system. The computer system includes a display 109 that shows available cloud computing systems (e.g. 111A, 111B, 112A and 112B). These cloud systems may be public clouds (111A/111B) or private clouds (112A/112B). As the names imply, public clouds are generally open to the public, while private clouds restrict membership in some manner.

Other types of clouds may also be used such as community clouds (where a cloud infrastructure is provisioned for exclusive use by a specific community of consumers from organizations that have shared concerns (e.g., mission, security requirements, policy, and compliance considerations) or hybrid clouds (where the cloud infrastructure includes two or more distinct cloud infrastructures (including private, community, or public clouds)). Each cloud, public, private, community or hybrid, may be run on a single server computer system or may be distributed over multiple servers. Moreover, each cloud may be run as part of a virtual server or on multiple virtual servers. Each cloud may be configured to provide processing resources, storage resources, networking resources or other computing resources.

Each cloud can run different software applications. In some cases, an application is run on a single cloud, while in other cases, an application is run on multiple clouds. Software applications may be divided into different sections or tiers, each of which may be assigned to a different cloud. Software application 125 includes three portions: portion A (126A), portion B (126B) and portion C (126C). As will be understood, each software application may include a different number of portions, and each application may include substantially any number of different portions. In the embodiment shown in FIG. 1, portion A is running on public cloud B (111B), portion B is running on private cloud A (112A) and portion C is running on private cloud B (112B). This is just one example of the many different possibilities for running application portions on different clouds.

In some cases, each cloud may have different commands. For instance, public cloud A may have a certain set of cloud-specific commands 117 for tasks such as starting execution of an application, stopping execution of an application, pausing execution, upgrading cloud or application software or deleting portions of the application. Many other commands are possible, and the above list is not intended to be exhaustive. The cloud management interface provided by computer system 101 may have its own native commands 116. The task mapping module 115 may be used to map the native commands entered by a user (105) into each cloud's cloud-specific commands. Thus, if the user entered a "shutdown" command, the task mapping module 115 may map the shutdown command to a "kill all services" command in private cloud B. In this manner, the computer system 101 may provide a common set of terms for performing tasks across a variety of different types of clouds that use different terms for those commands. These concepts will be explained further below with regard to methods 200, 300 and 400 of FIGS. 2, 3 and 4, respectively.

Figure 2:
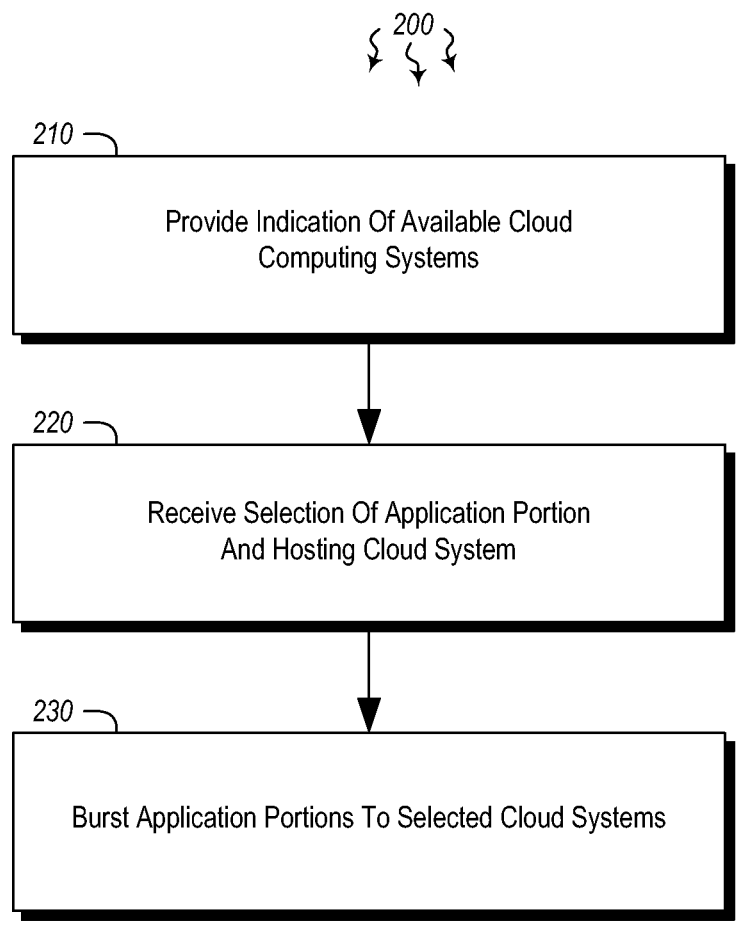
FIG. 2 illustrates a flowchart of an example method for bursting application portions to different types of cloud computing systems.
Figure 3:
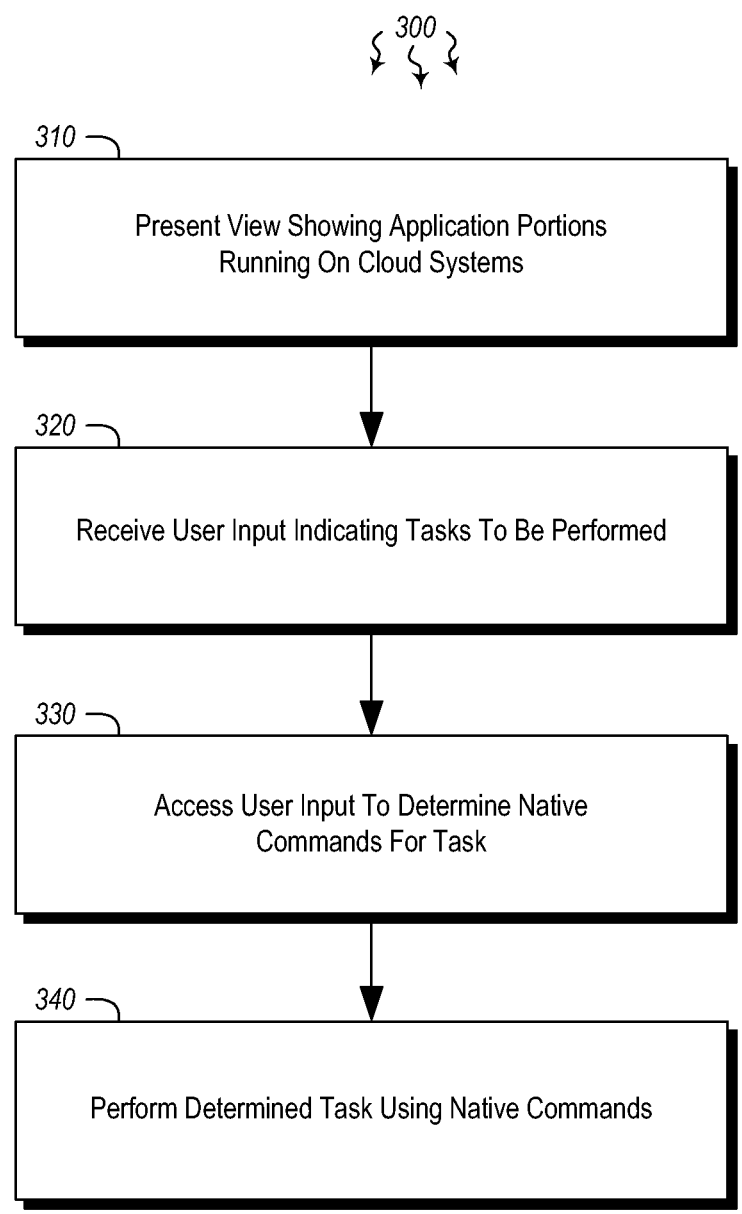
FIG. 3 illustrates a flowchart of an example method for managing distributed applications distributed over a plurality of different cloud types.
Figure 4:
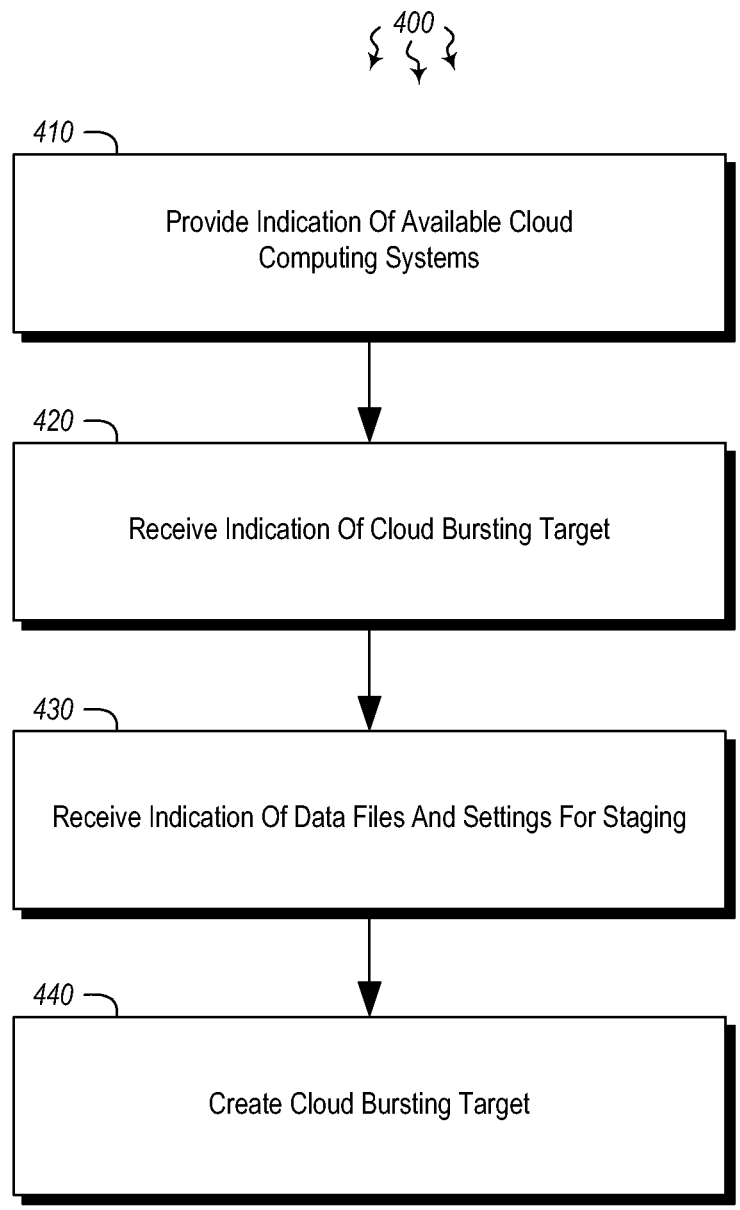
FIG. 4 illustrates a flowchart of an example method for creating a cloud bursting target in a specified cloud.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for bursting application portions to different types of cloud computing systems. The method 200 will now be described with frequent reference to the components and data of environment 100.

Method 200 includes an act of providing an indication of available cloud computing systems including at least a first cloud computing system of a first type and a second cloud computing system of a second, different type (act 210). For example, display 109 of computer system 101 may provide an indication of those cloud computing systems 110 that are available to user 105. The display shows that two public clouds are available (111A and 111B) and that two private clouds are available (112A and 112B). As cloud computing systems become available or lose their availability, they may be dynamically added to or removed from the display. The computer system 101 may be part of a cluster of other computer systems, or may be linked via a network to other computer systems in some manner. As such, computer system 101 is aware of and is communicatively linked to multiple different types of cloud computing systems, including public, private, proprietary, third party and other types of clouds.

Method 200 also includes an act of receiving a selection indicating that a portion of a software application currently hosted on the first cloud computing system of the first type is to be bursted onto the second cloud computing system (act 220). As used herein, the term "bursting" refers to moving the execution or hosting of an application on one cloud to one or more other clouds. Bursting may also refer to providing additional resources for a part of an application by running additional instances of the application in another cloud while the original instance remains running (as will be explained further below). Accordingly, user 105 may wish to move the execution of portion A (126A) of software application 125 from public cloud B (111B) to private cloud A (112A). The user may wish to change clouds for a variety of reasons including the price of hosting, price of bandwidth, reaching the end of a contract term, location or any of a variety of other reasons. The interface provided by computer system 101 allows the user to burst any portion of the application onto any type of cloud at virtually any time.

Then, in response to the user's selection, method 200 includes an act of bursting the software application portion from the first cloud computing system of the first type to the second cloud computing system of the second, different type (act 230). Thus, in the example above, if the user indicated in input 106 that the execution of portion A of software application 125 is to be bursted from public cloud B to private cloud A, public cloud B would cease hosting portion A and private cloud A would begin hosting portion A. This transition may occur seamlessly, even if the two clouds are of different types (i.e. different operating systems, different protocols, different commands, etc.). Each portion of the software application may then be presented in the cloud computing system to which that portion has been assigned. Thus, if user 105 were to select private cloud A (e.g. by clicking on it), private cloud A would then show that it is hosting portion A of software application 125.

Accordingly, in some embodiments, a view may be presented that shows a specified cloud computing system (e.g. private cloud A) and each of the application portions hosted on that cloud computing system. The view may show that, for example, public cloud A (111A) is hosting portion C of software application 125, as well as portion B of a different application and portion E of still another application. The view may be dynamically updated as application portions are bursted to and from public cloud A. The user 105 may switch views when desired to go from a view showing a specific cloud computer system to the main view showing all (or a portion) of the available clouds 110. Once in the main view, the user may select a different cloud, and the computer system 101 will generate a view from the selected cloud computing system's perspective.

The software application portions may be bursted to other clouds according to the desires of the user (e.g. an administrator) or according to policy. For instance, a client may have a policy (or change their policy) to indicate that their application is only to be run on public clouds, or is only to be run on clouds whose servers are located in a particular geographic region. In such cases, application portions may be bursted to other clouds that comply with the user's specified policy.

Turning now to method 300 of FIG. 3, a flowchart illustrates managing distributed applications distributed over a plurality of different cloud types. The method 300 will now be described with frequent reference to the components and data of environment 100.

Method 300 includes an act of presenting a view that shows one or more software application portions running on one or more cloud computing systems (act 310). For example, FIG. 1 shows display 109 with four different cloud computing systems: two are public (111A and 111B) and two are private (112A and 112B). Various portions of software application 125 are shown as being run on the various clouds (e.g. portion C is being run on private cloud B). Method 300 then includes an act of receiving a user input indicating one or more tasks that are to be performed on at least one software application portion running on a user-selected cloud computing system (act 320). For example, a task may include starting, stopping or pausing execution of an application portion, resuming execution, updating the application, deleting application files or any other of a variety of tasks. Each cloud may have its own nomenclature for commands. For example, in public cloud B a command to temporarily halt processing may be a "Pause" command while in private cloud A, the command to temporarily halt processing is a "Suspend" command. Accordingly, each cloud may have its own cloud-specific commands 117.

Method 300 then accesses the received user input to determine which task is to be performed using commands that are native to the user-selected cloud computing system (act 330). Task mapping module 115 may access the task(s) 107 specified in user input 106 to determine which command(s) that task maps to on the specified cloud. Thus, for instance, in the example above, if the user sent a native "Pause" command to the cloud management interface of computer system 101 to pause execution on private cloud A, the task mapping module would map the "Pause" command to the cloud-specific "Suspend" command of private cloud A. The task mapping module 115 may store a mapping that maps between computer system 101's native commands 116 and each cloud's cloud-specific commands 117. This mapping may be updated each time a public or private cloud changes its task/command nomenclature.

After user's task 107 has been properly mapped to a cloud-specific command, the task performing module 120 performs the determined task using native commands on the at least one software application portion on the user-selected cloud computing system (act 340). Thus, continuing the above example, if the user had input the "Pause" command, the "Suspend" command would be sent to private cloud A to temporarily halt execution of the application portion. In some cases, the task may include an update. As such, an update may be initiated for each portion of the software application while one or more parts of the application are being executed on different cloud computing systems. Accordingly, each application portion or tier can be updated separately, while the other parts of the application are being run on different cloud computing systems.

Turning now to FIG. 4, FIG. 4 illustrates a flowchart of a method 400 for creating a cloud bursting target in a specified cloud. The method 400 will now be described with frequent reference to the components and data of environment 100.

Method 400 includes an act of providing an indication of available cloud computing systems including at least a first cloud computing system of a first type and a second cloud computing system of a second, different type (act 410). As described above, computer system 101 may provide a display 109 that shows the available cloud computing systems 110. The available clouds are those that the user has access to (e.g. by paying a fee to that company). The available clouds may include all different types of clouds including public, private, third party, proprietary systems and other clouds. The computer system can receive input from users (e.g. input 106 from user 105). In some cases, the input may indicate that a first cloud computing system of a first type is to be used as a cloud bursting target (act 420). A bursting target is a cloud to which the execution or hosting of an application is to be bursted. Thus, if the user chose public cloud A (111A) as a bursting target, public cloud A would be used to host at least a portion of the user's software application according to predefined settings.

Figure 6:
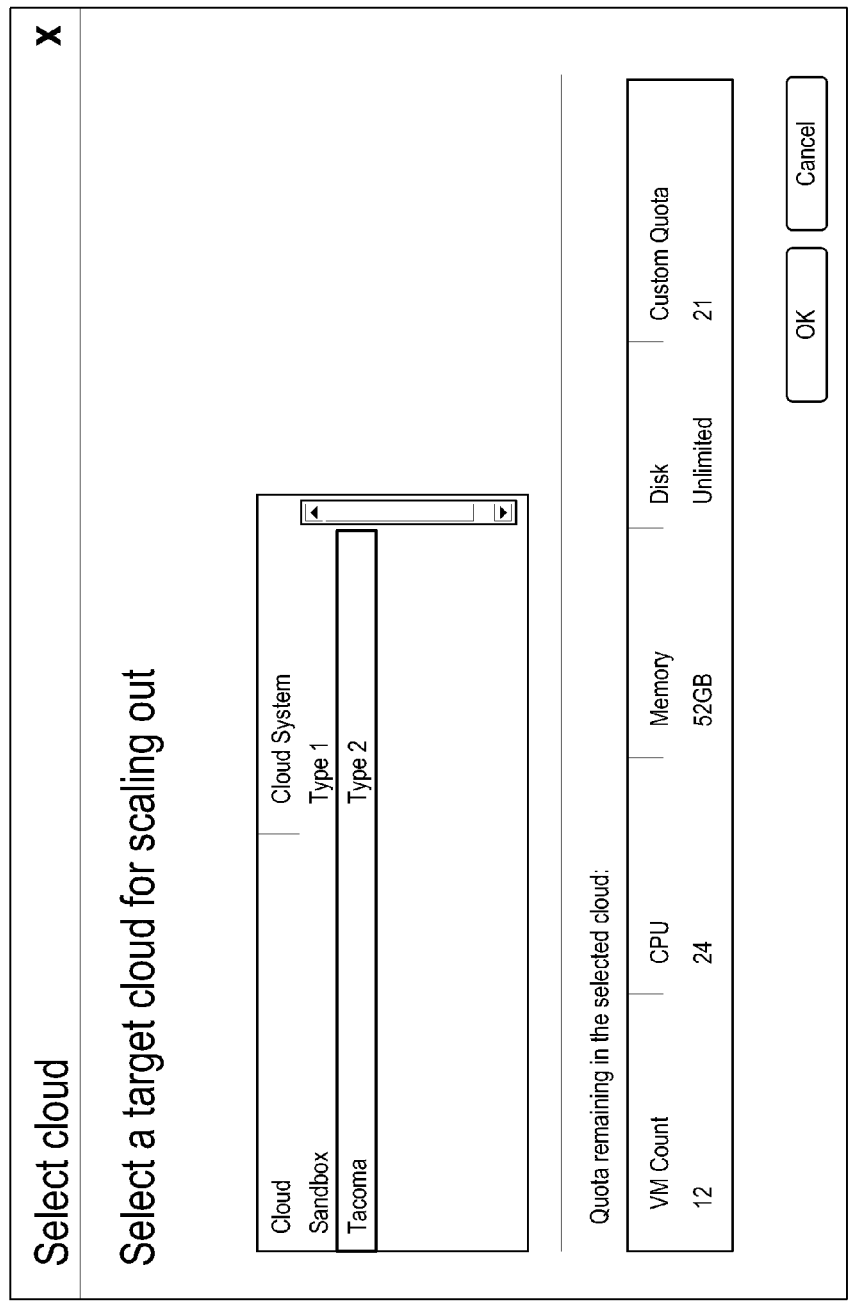
FIG. 6 illustrates a configuration window in which distributed applications distributed over a plurality of different cloud types are managed.

For instance, as shown in FIG. 6, an interface may be provided that allows a user to select a bursting target (i.e. a target cloud for scaling out). The available clouds may include "Sandbox" of cloud type 1 (e.g. operating system A) and "Tacoma" of cloud type 2 (e.g. operating system B). The selected bursting target, Tacoma, is shown to have a virtual machine (VM) count of 12 virtual machines, 24 central processing units (or cores), 52 gigabytes (GB) of available memory, unlimited disk space and a custom quota of 21. It will be understood that any of these settings may be changed for each cloud, and that each cloud may have its own set of settings. Moreover, the settings may be different for each user, or for different payment plans (e.g. more expensive cloud hosting plans include more computing resources).

When the user selects a bursting target (e.g. Tacoma), the cloud type may be different than the cloud type that is currently hosting the user's applications (or application portions). The user may select any different type of cloud computing system that shows up as available in the main display 109. In some cases, the bursting target may be staged beforehand with one or more data files and settings associated with software application that is to be bursted across cloud computing systems. Thus, for example, if software application 125 was to be bursted to the Tacoma cloud, at least a portion of the application's files and/or settings may be setup before the cloud actually starts hosting the application. In this manner, once hosting is to begin, startup time is minimal as most of the files and settings are already in place.

In some embodiments, a template is created for each bursting target. The template includes information and settings needed to instantiate an instance of the software application in the target cloud. Thus, the template provides an outline of repeatable steps to ensure that any time such an application is deployed or upgraded, the same set steps can be performed and the application will be properly deployed.

Figure 5:
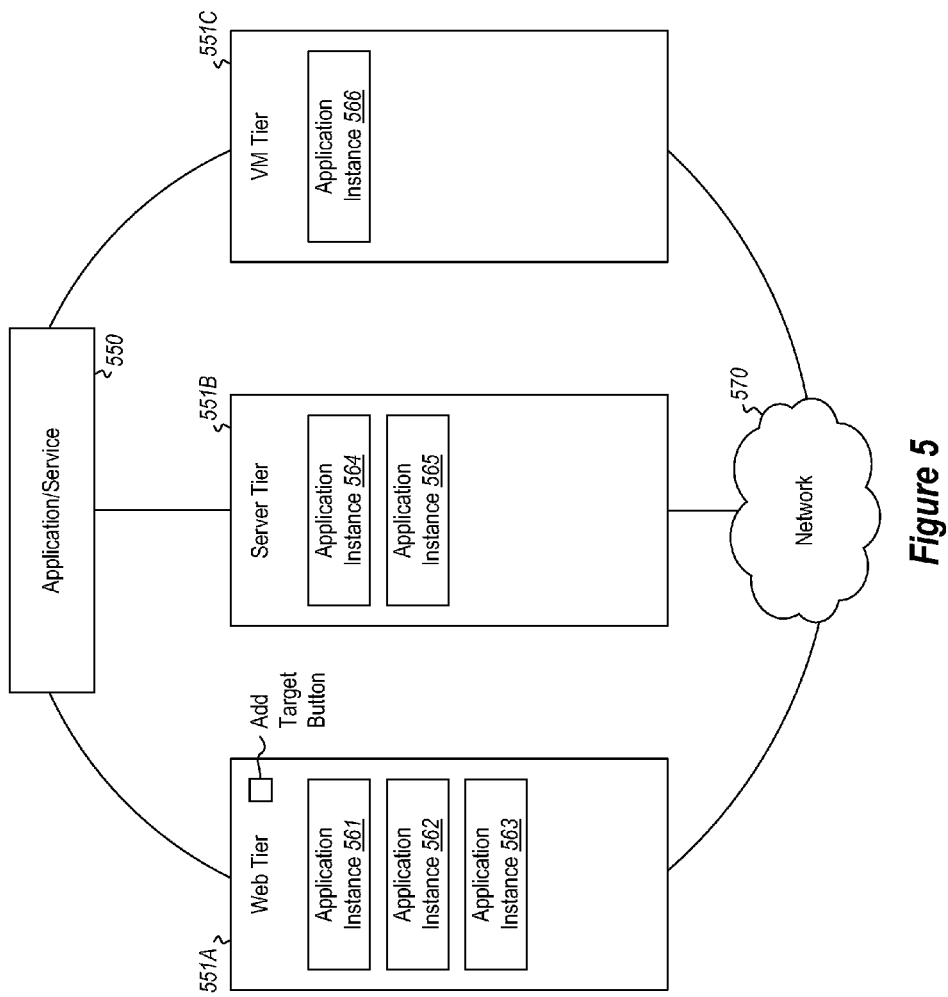
FIG. 5 illustrates an embodiment in which distributed applications distributed over a plurality of different cloud types are managed.

As mentioned above, each application or service may include different portions or tiers. Each of those application portions or tiers may include multiple instances. Thus, as shown in FIG. 5, application/service 550 may include three portions/tiers: web tier 551A, server tier 551B and virtual machine (VM) tier 551C. The web tier includes three application instances (561, 562 and 563), the server tier includes two application instances (564 and 565) and the VM tier includes one application instance (566). It will be understood that each application portion or tier may include substantially any number of instances. Each of these tiers may be configured to communicate with other computer systems using network 570. Each tier may include various buttons including an "Add Target Button" as shown in web tier 551A. The add target button may allow a user to add bursting targets. Once the add target button has been clicked, the interface of FIG. 6 (as described above) may be shown). Once the user has selected a bursting target for the tier or for one application instance of a tier, that application instance may be bursted to that cloud.

Next, method 400 includes an act of receiving a second indication specifying data files and settings that are to be staged on the cloud bursting target (act 430). Thus, user 105 may indicate that data files and/or settings of application 125 are to be staged on the Tacoma cloud. The user may also indicate that other portions of the application are to be staged on other clouds computing systems (potentially of different types). Then, in response to the user's indications, method 400 includes an act of creating the cloud bursting target according to the predefined settings (act 440). Then, after the application has been bursted to the bursting target, the bursting target (e.g. the Tacoma cloud) hosts the indicated portion or instance of the software application.

Figure 7:
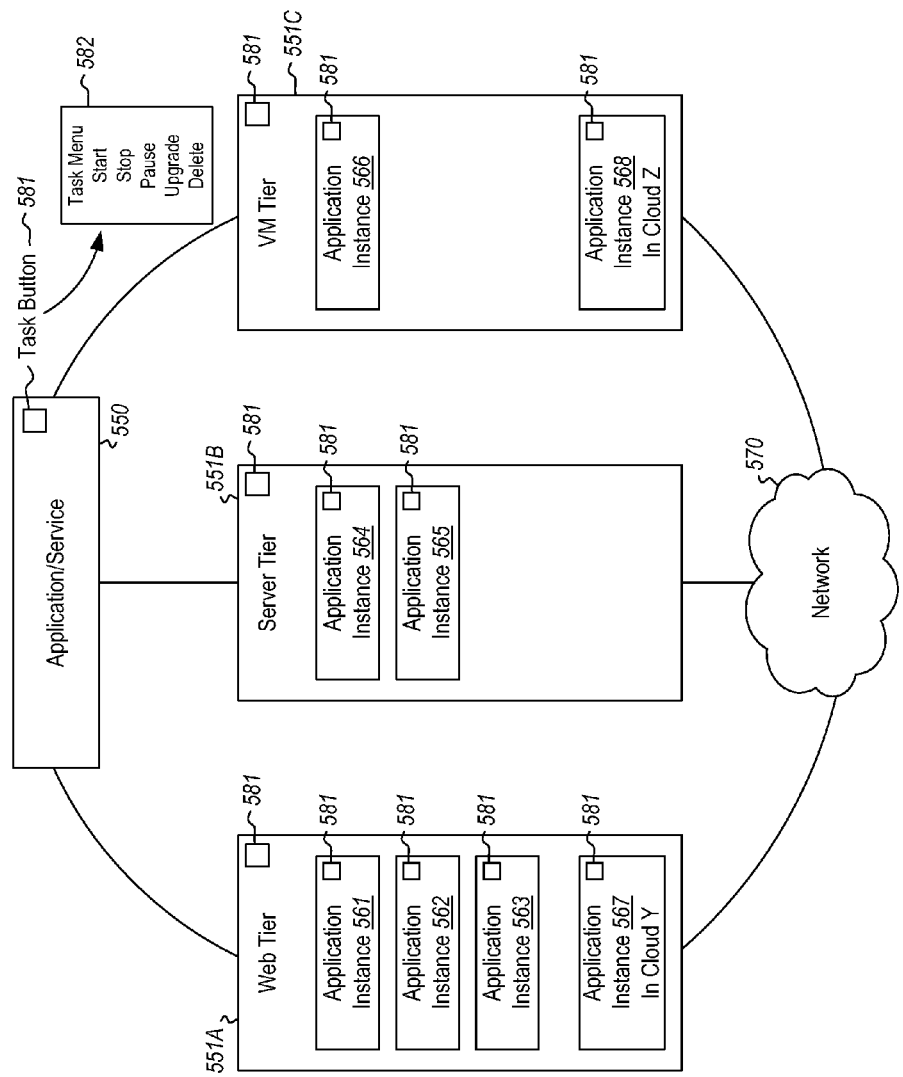
FIG. 7 illustrates an alternative embodiment in which distributed applications distributed over a plurality of different cloud types are managed.

Accordingly, as shown in FIG. 7, application instance 567 may be bursted to cloud Y and application instance 568 may be bursted to cloud Z. The user may click on any given instance to see where that instance is being hosted and what hosting settings are in place. Alternatively, the user may click on a tier or on the application 550 to view where each tier and/or instance is being hosted. In this view, a user may also perform commands on any of the application's tiers or instances. As shown in FIG. 7, if a user selects task button 581, a task menu 582 may be displayed. The task menu shows common tasks in the interface's native language. As described above, any commands selected may be interpreted and mapped to corresponding cloud-specific commands.

In some embodiments, the computer system 101 may be configured to translate settings and migrate software application content to the chosen cloud bursting target. Upon determining that the cloud bursting target has been initialized or created, the software application may be automatically scaled out to the selected cloud bursting target. In some cases, the application may be automatically scaled out upon determining that a predetermined application usage threshold has been met. Thus, in such cases, once an application has shown sufficient usage, it is automatically bursted to the chosen cloud(s). Conversely, a software application may be automatically scaled back upon determining that software application usage is below a predetermined application usage threshold. This usage threshold may be defined by a user or may be derived from historical application usage data. Thus, the threshold may be set, for example, based on how much an application has been used over a specified time period (e.g. an hour, a day, week, month, etc.), or, in some cases, the threshold may be set based on a future, predicted usage.

Accordingly, as described above, methods, systems and computer program products are provided which burst application portions to different types of cloud computing systems. Moreover, methods, systems and computer program products are provided which manage distributed applications distributed over multiple different cloud types and which create cloud bursting targets in specified clouds.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method, implemented at a computer system that includes one or more processors, for bursting application portions to different types of cloud computing systems, the method comprising:

providing an indication of available cloud computing systems, including at least a first cloud computing system and a second cloud computing system, the first cloud computing system having one or more first commands that are expressed with a first nomenclature for invoking one or more first cloud functions the second cloud computing system having one or more second commands that are expressed with a second nomenclature that is different from the first nomenclature for invoking one or more second cloud functions that are equivalent to the one or more first cloud functions;

receiving a selection indicating that a portion of a software application that is currently hosted on the first cloud computing system is to be bursted onto the second cloud computing system; and in response to the selection, bursting the portion of the software application from the first cloud computing system to the second cloud computing system, including:

identifying a particular first command of the one or more first commands that is used at the first cloud computing system for invoking a particular first cloud function of the one or more first cloud functions in connection with execution of the portion of the software application at the first cloud computing system;

identifying a particular second command of the one or second commands that invokes a particular second cloud function of the one or more second cloud functions that is equivalent to the particular first cloud function; and mapping the particular first command to the particular second command, such that the particular second command, instead of the particular first command, is used at the second cloud computing system for invoking the particular second cloud function in connection with execution of the portion of the software application at the second cloud computing system.

2. The method of claim 1, wherein each portion of the software application is presented in a corresponding cloud computing system in which that portion is currently being hosted.

3. The method of claim 1, wherein a view is presented that shows a specified cloud computing system and each application portion hosted on that specified cloud computing system.

4. The method of claim 3, further comprising switching between cloud computing system views in response to a user input selecting which cloud computing system's perspective to present.

5. The method of claim 1, wherein the computer system is aware of and is communicatively linked to a plurality of different types of cloud computing systems including at least the first and second cloud computing systems.

6. The method of claim 1, wherein a second portion of the application currently being hosted on the second cloud computer system is bursted on to a third cloud computing system.

7. The method of claim 1, wherein portions the software application are bursted to cloud computing systems in specified geographic regions.

8. The method of claim 1, further comprising creating a template for the second cloud computing system, wherein the template includes a series of steps that allow instances of the software application to be instantiated in the second cloud computing system in a repeatable manner.

9. The method of claim 1, wherein each portion of the software application hosted on the first and second cloud computing systems is separately updateable.

10. The method of claim 1, wherein separate portions of the same software application are hostable on the first and second cloud computing systems simultaneously.

11. A computer system, comprising:
one or more processors;
system memory; and
one or more computer-readable storage media having stored thereon computer-executable instructions that are structured such that, when executed by the one or more processors, the computer-executable instructions configure the computer system to create a cloud bursting target in a specified cloud, including computer-executable instructions that configure the computer system to perform at least the following:

provide an indication of available cloud computing systems, including at least a first cloud computing system and a second cloud computing system, the first cloud computing system having one or more first commands that are expressed with a first nomenclature for invoking one or more first cloud functions, the second cloud computing system having one or more second commands that are expressed with a second nomenclature that is different from the first nomenclature for invoking one or more second cloud functions that are equivalent to the one or more first cloud functions;

receive a selection indicating that a portion of a software application that is currently hosted on the first cloud computing system is to be bursted onto the second cloud computing system; and in response to the selection, burst the portion of the software application from the first cloud computing system to the second cloud computing system, including:

identifying a particular first command of the one or more first commands that is used at the first cloud computing system for invoking a particular first cloud function of the one or more first cloud functions in connection with execution of the portion of the software application at the first cloud computing system;

identifying a particular second command of the one or second commands that invokes a particular second cloud function of the one or more second cloud functions that is equivalent to the particular first cloud function; and mapping the particular first command to the particular second command, such that the particular second command, instead of the particular first command, is used at the second cloud computing system for invoking the particular second cloud function in connection with execution of the portion of the software application at the second cloud computing system.

12. The computer system of claim 11, also including computer-executable instructions that confiire the computer system to migrate software application content to the cloud bursting target.

13. The computer system of claim 11, also including computer-executable instructions that configure the computer system to scale out the software application to the cloud bursting target.

14. The computer system of claim 13, wherein the software application is automatically scaled out to the cloud bursting target upon determining that a predetermined application usage threshold has been met.

15. The computer system of claim 14, wherein the software application is automatically scaled back upon determining that software application usage is below the predetermined application usage threshold.

16. The computer system of claim 14, wherein the predefined threshold is defined by a user or is derived from historical application usage data.

17. The computer system of claim 11, also including computer-executable instructions that configure the computer system to stage the cloud bursting target with one or more data files and settings associated with the portion of the software application that is to be bursted onto the second computing system.

18. The computer system of claim 11, also including computer-executable instructions that comfigure the computer system to create a template for the cloud busting target, the template including information and settings needed to instantiate an instance of the software application in the second cloud computing system.

19. The computer system of claim 11, wherein separate portions of the same software application are hostable on the first and second cloud computing systems simultaneously.

20. A computer program product comprising one or more hardware storage devices having stored thereon computer-executable instructions that are structured such that, when executed by one or more processors of a computing system, the computer-executable instructions configure the computing system to burst application portions to different types of cloud computing systems, including computer-executable instructions that configure the computing system to perform at least the following:

provide an indication of available cloud computing systems, including at least a first cloud computing system and a second cloud computing system, the first cloud computing system having one or more first commands that are expressed with a first nomenclature for invoking one or more first cloud functions, the second cloud computing system having one or more second commands that are expressed with a second nomenclature that is different from the first nomenclature for invoking one or more second cloud functions that are equivalent to the one or more first cloud functions;

receive a selection indicating that a portion of a software application that is currently hosted on the first cloud computing system is to be bursted onto the second cloud computing system; and in response to the selection, burst the portion of the software application from the first cloud computing system to the second cloud computing system, including:

identifying a particular first command of the one or more first commands that is used at the first cloud computing system for invoking a particular first cloud function of the one or more first cloud functions in connection with execution of the portion of the software application at the first cloud computing system;

identifying a particular second command of the one or second commands that invokes a particular second cloud function of the one or more second cloud functions that is equivalent to the particular first cloud function; and mapping the particular first command to the particular second command, such that the particular second command, instead of the particular first command, is used at the second cloud computing system for invoking the particular second cloud function in connection with execution of the portion of the software application at the second cloud computing system.

* * * * *